(12) United States Patent
Maenpaa

(10) Patent No.: US 7,593,524 B2
(45) Date of Patent: Sep. 22, 2009

(54) HINGE ARRANGEMENT

(75) Inventor: Jani C. Maenpaa, Helsinki (FI)

(73) Assignee: Nokia Corporation, Espoo (FI)

( * ) Notice: Subject to any disclaimer, the term of this patent is extended or adjusted under 35 U.S.C. 154(b) by 472 days.

(21) Appl. No.: 11/604,417

(22) Filed: Nov. 27, 2006

(65) Prior Publication Data

US 2008/0125195 A1    May 29, 2008

(51) Int. Cl.
*H04M 1/00*    (2006.01)
*H04M 9/00*    (2006.01)
(52) U.S. Cl. ............................. 379/433.13; 455/575.3
(58) Field of Classification Search ............ 379/428.01, 379/433.11, 433.13; 455/90.3, 575.1, 575.3
See application file for complete search history.

(56) References Cited

U.S. PATENT DOCUMENTS

| 4,691,979 | A | 9/1987 | Manska | ..................... 439/82 |
| 6,373,006 | B1 | 4/2002 | Toki | ........................ 200/61.7 |
| 7,005,588 | B2 | 2/2006 | Pihlaja | ..................... 200/5 A |
| 2003/0114184 | A1 | 6/2003 | Wilson | ...................... 455/550 |
| 2003/0118179 | A1 | 6/2003 | Barnett et al. | .......... 379/428.01 |
| 2006/0133052 | A1 | 6/2006 | Harmon et al. | ............ 361/752 |

FOREIGN PATENT DOCUMENTS

| EP | 1 679 858 A1 | 7/2006 |
| JP | 4-277958 | 2/1992 |
| WO | WO 2004/095717 A2 | 11/2004 |
| WO | WO 2005/120019 A1 | 12/2005 |

*Primary Examiner*—Tuan D Nguyen
(74) *Attorney, Agent, or Firm*—Harrington & Smith, PC

(57) ABSTRACT

A hinge arrangement including a living hinge adapted to movably connect two members to each other; and at least one plate spring adapted to connect to the two members. When the two members are in a folded position, the living hinge has a general "U" shape and the plate spring has a general "U" shape aligned with and generally overlapping the general "U" shape of the living hinge.

35 Claims, 14 Drawing Sheets

HINGE ARRANGEMENT

BACKGROUND OF THE INVENTION

1. Field of the Invention

The invention relates to a hinge arrangement and, more particularly, to a hinge arrangement used for a portable electronic device.

2. Brief Description of Prior Developments

Mobile telephones having a flip-phone or clam shell design are known in the art. A multi-piece hinge is used to connect two housing members of the telephone between a closed folded position and an open unfolded position. However, problems regarding the electrical flex cable between the two housing members can occur. The hinges are also usually complicated systems because of the flex cable running between the housing members, and complicated to address the issue of the flex cable path between the housing members. Miniaturization of conventional hinge designs is also a problem because of the dimensional limitations.

There is a desire to provide a hinge arrangement which can overcome problems relating to the flex cable path between the two housing members in a portable electronic device. There is also a desire to provided a hinge arrangement for a portable electronic device which is less complicated to manufacture and assemble than conventional hinges. There is also a desire to provided a hinge arrangement which will be easier to miniaturize than conventional hinge designs for future smaller size products.

SUMMARY OF THE INVENTION

In accordance with one aspect of the invention, a hinge arrangement is provided including a living hinge adapted to movably connect two members to each other; and at least one plate spring adapted to connect to the two members. When the two members are in a folded position, the living hinge has a general "U" shape and the plate spring has a general "U" shape aligned with and generally overlapping the general "U" shape of the living hinge.

In accordance with another aspect of the invention, a portable electronic device is provided comprising a first housing member, a second housing member, and a first plate spring. The first housing member comprises electronic circuitry. The second housing member is pivotably connected to the first housing member by a pivotable connection. The first plate spring is connected to the first and second housing members proximate the pivotable connection. The plate spring is adapted to bend between a general "U" shape when the first and second housing members are in a folded position and a substantially straight shape when the first and second members are in an open un-folded position.

In accordance with another aspect of the invention, a portable electronic device is provided comprising a first housing member, a second housing member, and a system for audibly signaling when the first and second housing members are over-rotated past the open un-folded position. The first housing member comprises electronic circuitry. The second housing member is pivotably connected to the first housing member by a pivotable connection between a closed folded position and an open unfolded position.

In accordance with another aspect of the invention, a method of manufacturing a portable electronic device is provided comprising providing a pivotable connection between a first housing member and a second housing member, wherein the pivotable connection comprises a living hinge, and wherein the first and second housing members are movable between a folded position and an un-folded position; and connecting at least one spring to the first and second housing members to bias the first and second housing members towards the un-folded position, wherein the at least one spring comprises a plate spring which has a general "U" shape when the first and second housing members are in the folded position, and wherein the plate spring has a substantially straight shape when the first and second housing members are in the un-folded position.

BRIEF DESCRIPTION OF THE DRAWINGS

The foregoing aspects and other features of the invention are explained in the following description, taken in connection with the accompanying drawings, wherein.

DETAILED DESCRIPTION OF THE PREFERRED EMBODIMENTS

Figure 1:
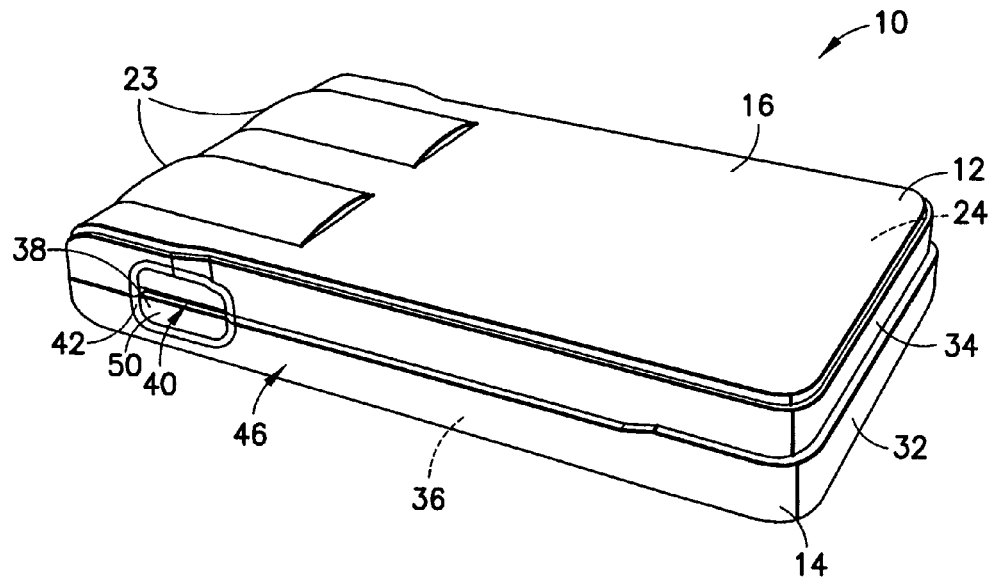
FIG. 1 is a perspective view of a mobile telephone comprising features of the invention.

Referring to FIG. 1, there is shown a perspective view of a portable electronic device 10 incorporating features of the invention. Although the invention will be described with reference to the exemplary embodiments shown in the drawings, it should be understood that the invention can be embodied in many alternate forms of embodiments. In addition, any suitable size, shape or type of elements or materials could be used.

In this embodiment the portable electronic device 10 is a mobile telephone. More specifically, the telephone has a flipphone type of design. However, features of the invention could be used with any type of telephone having housing members which are movable relative to each other, such as a slide phone for example. In addition, features of the invention could be used in any type of portable electronic device having housing members which are movable relative to each other, such as a gaming device, a PDA, etc.

Figure 2:
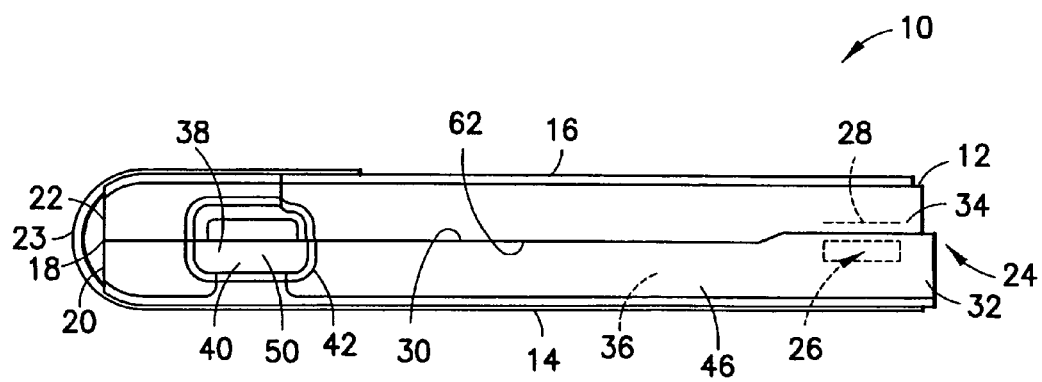
FIG. 2 is a side view of the telephone shown in FIG. 1.
Figure 3:
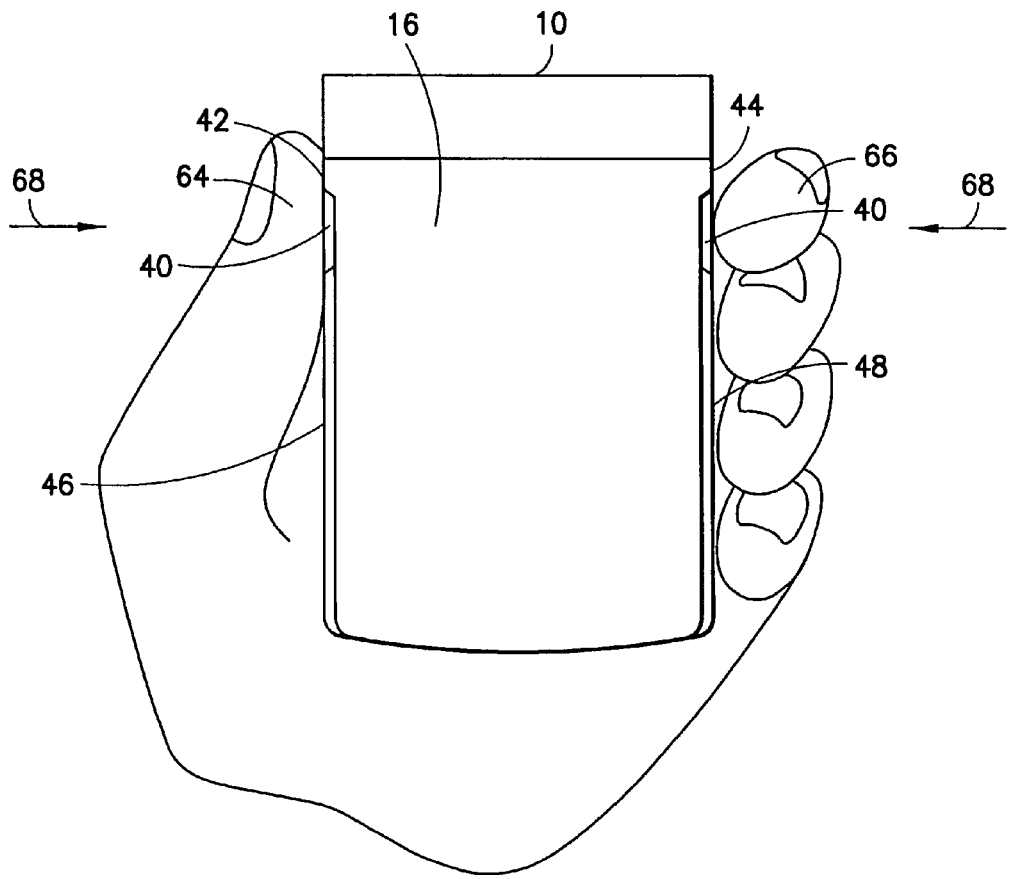
FIG. 3 is a front plane view of the telephone shown in FIG. 3 being held in the hand of a user.

The telephone 10 generally comprises a housing 12 having a first housing member 14 and a second housing member 16. Referring also to FIGS. 2-3, the first and second housing members 14, 16 are pivotably connected to each other by a hinge 18 between a closed position as shown in FIGS. 1-3 and an open position. In this embodiment the hinge 18 is a living hinge. However, in alternate embodiments the hinge could comprise any suitable type of pivotable connection. As noted above, features of the invention could be used with a slide phone. Therefore, the connection of the housing members to each other might not be a pivotable connection. The hinge 18 connects the top ends 20, 22 of the housing members to each other.

Figure 12:
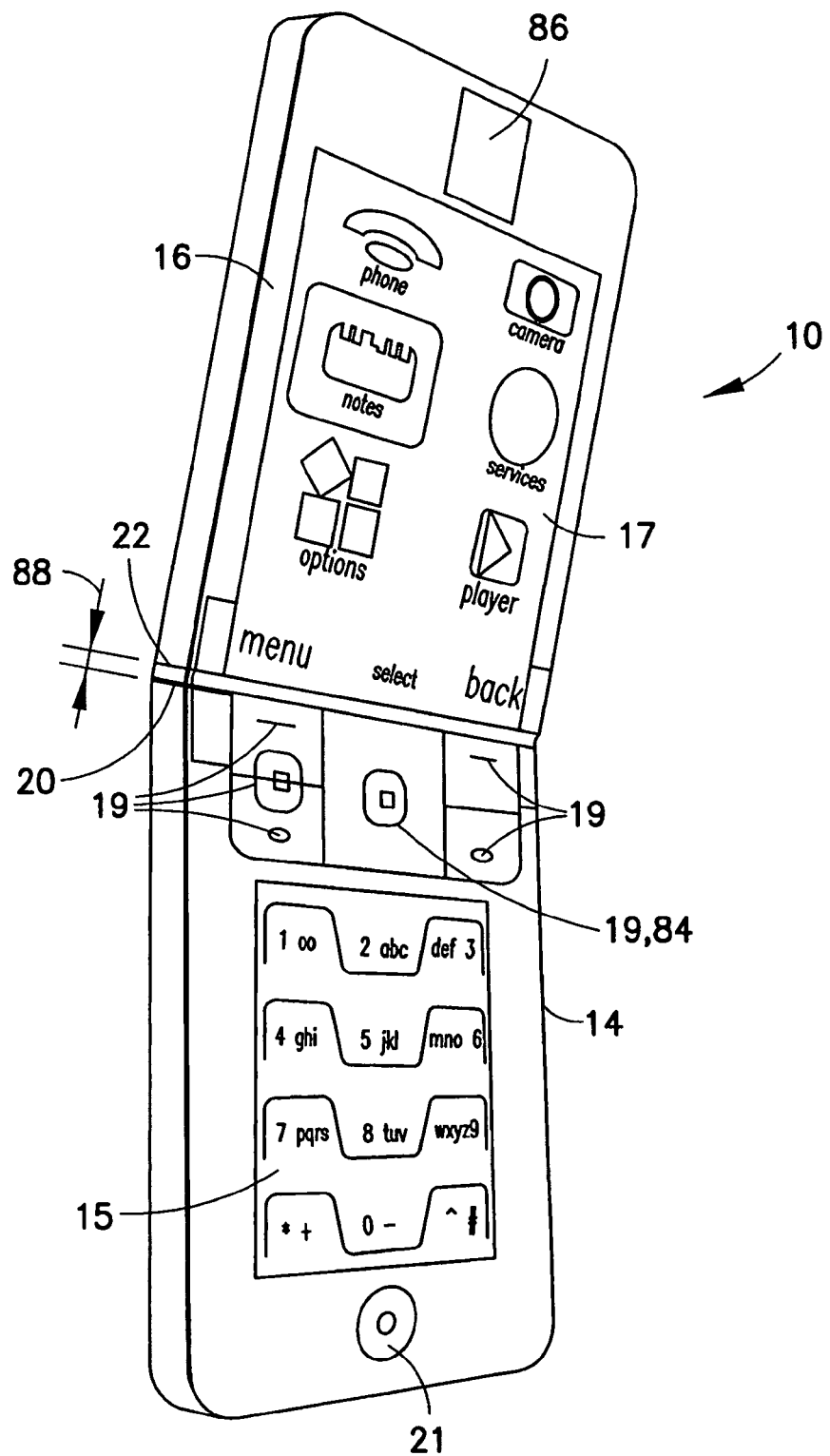
FIG. 12 is a perspective view of the telephone shown in FIG. 1 is an open, unfolded position.

Referring also to FIG. 12, in this embodiment the first housing member 14 generally comprises electronic circuitry 36, a battery, a keypad 15, control keys 19 including a joystick 84, and a microphone 21. The second housing member 16 generally comprises a display 17 and a sound transducer or speaker 86. When the first and second housing members are in their closed position, the display is protectively covered by the first housing member 14 and the keypad is protectively covered by the second housing member 16.

In order to use most features of the telephone, the second housing member 16 must be unlatched from the first housing member 14 and moved to its open position. This uncovers the display and the keypad. In this embodiment the telephone has leaf springs 23 which are adapted to bias the housing members 14, 16 towards the open position. However, any suitable system for biasing the housing members towards an open position could be provided. Alternatively, a system for biasing the housing members towards an open position might not be provided.

The telephone 10 also comprises a latch system 24 for latching the first and second housing members at the closed position. In this embodiment the latch system comprises a permanent magnet 26 in the first housing member 14 and a suitable magnetically latchable ferromagnetic member 28 in the second housing member 16. The magnet 26 and latchable member 28 are located proximate top and bottom sides 30, 62, respectively, of the bottom ends 32, 34 of the housing members 14, 16. The magnet 26 and the latchable member 28 function as a latch to retain the second housing member 16 against the top side 30 of the first housing member 14 at the closed position. In an alternate embodiment, the latching system to retain the first and second housings in their closed position could comprise any suitable type of latching system including, for example, a resilient latching snap or other mechanical design. Thus, the type of latch is not limited to merely a magnetic latch.

Figure 4:
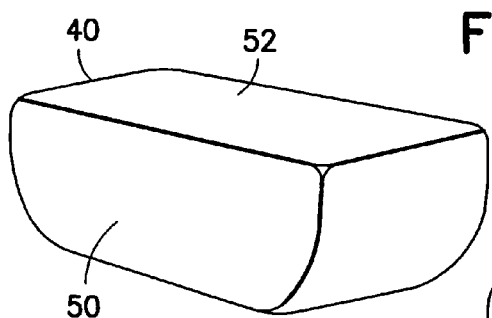
FIG. 4 is a perspective view of a component of the an opening system used in the telephone of FIGS. 1-3 shown in a home state.

In order to overcome the latching system 24 and move the second housing member 16 from the closed position, the telephone 10 comprises a latch release or opening system 38. With the magnetic latch system in this embodiment, the latchable member 28 need only to be moved away from the magnet 26 a relatively small amount to substantially overcome the magnetic holding force of the magnet. Referring also to FIG. 4, in this embodiment the opening system 38 comprises two bodies 40. However, in alternate embodiments more or less than two bodies could be provided. The first housing member 14 comprises two cavities 42, 44 located at opposite lateral sides 46, 48 of the first housing member. The bodies 40 are mounted in the respective cavities 42, 44.

Figure 5:
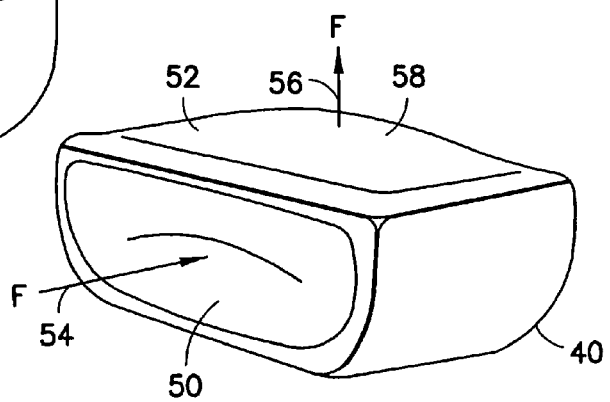
FIG. 5 is a perspective view of the component of FIG. 4 shown in an actuated state.

The bodies 42, 44 are identical, but could be different. Each body 42, 44 has a general block shape. However, in alternate embodiments any suitable shape could be provided. In this embodiment the block shape is generally rectangular. Each body is comprised of an elastic material such that the bodies form resiliently deformable structures. More specifically, and referring also to FIG. 5, each body 42, 44 forms a bubble body or bubble mass which is adapted to have a first side 50 depressed inward as shown by arrow 54 which automatically resulting in a second side 52 bubbling outward as shown by arrow 56 and resulting in a mound 58 being formed. The bodies 40 could be overmolded onto the housing member 14. Thus, the telephone could have a multi-material molded elastic push button and rigid frame.

When the bodies 40 are mounted to the first housing member 14, they are located in the cavities 42, 44 such that each first side 50 is at the lateral sides 46, 48 respectively, and that each second side 52 is located at the front or top side 60 of the first housing member 14. In this embodiment the first and second sides 50, 52 are substantially flat in a home state. However, they could have contoured or shaped surfaces. When the second housing member 16 is located at the closed position, the first sides 50 are exposed at the lateral sides 46, 48. The second sides 52 are directly opposite the inner facing side 62 of the second housing member 16. The rest of the sides of the bodies 40 are contacted and supported by the first housing member 14. The surfaces of the first housing member 14 contacting the bodies 40 are rigid, such that the rest of the sides of the bodies are prevented from bulging outward when the first side 50 is depressed inward. Thus, when the first side 50 is depressed inward, only the second top side 52 is able to bulge or bubble outward. Alternatively, the thickness of the wall at the second side 52, such as in a balloon style configuration of the body 40 described in further detail below, could be thinner than the other walls of the body.

Figure 6:
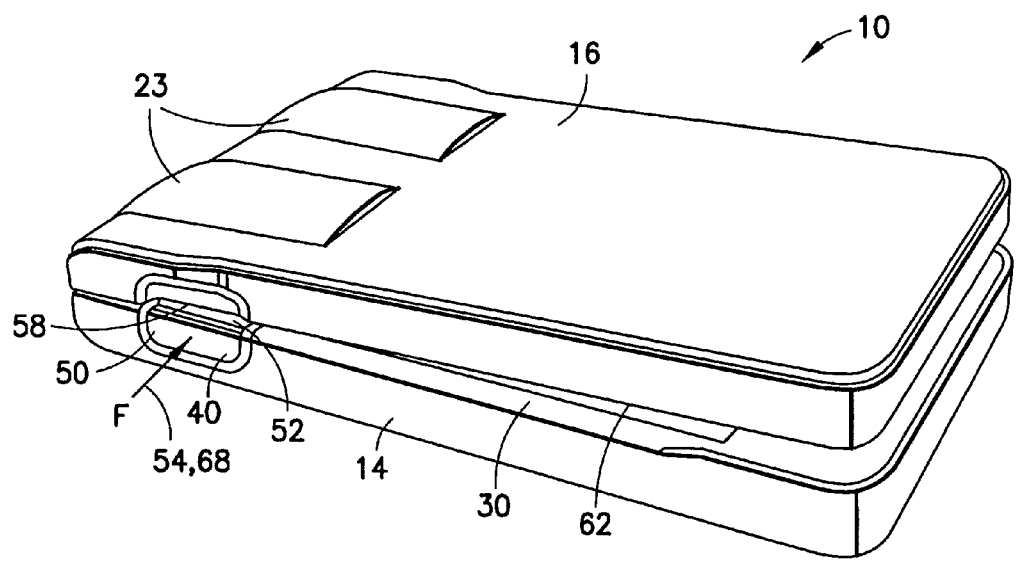
FIG. 6 is a perspective view of the telephone as shown in FIG. 1 with the opening system actuated.
Figure 7:
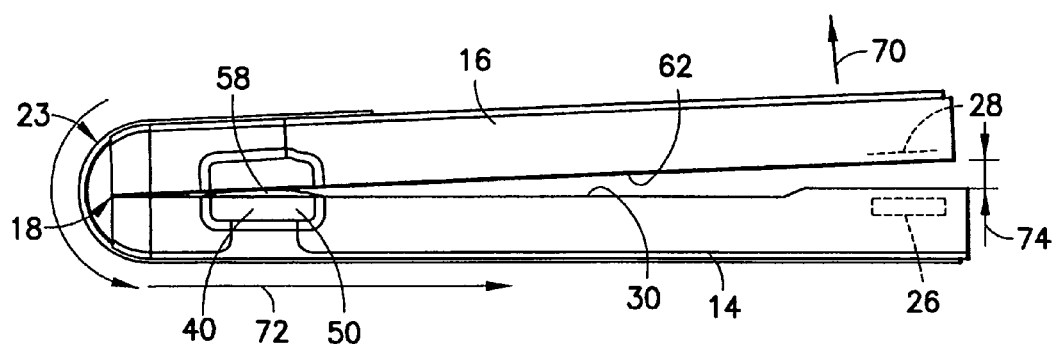
FIG. 7 is a side view of the telephone shown in FIG. 6.

As seen with reference to FIG. 3, when the telephone 10 is in its closed position, it can be held in the hand of a user with the user's thumb 64 and one other finger 66 located on the first sides 50 of the two bodies 40. By squeezing the two fingers inward as shown by arrows 68, the user can depress the first sides 50 inward with a single hand. As seen with reference to FIG. 5, this will result in the second side 52 of each body 40 bulging or bubbling upward. Referring also to FIGS. 6 and 7, because the second side 52 is located against the side 62 of the second housing member 16, the resulting mounds 58 push the second housing member 16 away from the closed position as indicated by arrow 70. This moves the second housing 16 relative to the first housing 14 to unlatch the latching engagement of the latching system 24. Because of the different distances from the hinge 18 of the mounds 58 and the latchable member 28, the relatively small height of the mounds 58 result in much a larger resultant spacing distance 74 of the latchable member 28 away from the magnet 26. With the latching system 24 unlatched, the springs 23 can bias the second housing member 16 further towards the open position. In this embodiment, the leaf springs 23 are adapted to slide into the first housing member 14 as indicated by arrow 72 as the housing opens to its open position.

Once the initial latching force of the latching system is overcome by the opening system 38, the user can reduce the force exerted by his or her fingers 64, 66. The user no longer needs to depress the first side 50 of the bodies 40 inward after the latch system 24 is initially overcome. The bodies 40 can return to their home states as shown in FIG. 4. Thus, the user can close the telephone again without the bodies 40 interfering with the latchable member 28 engaging the magnet 26.

As noted above, each body 40 is comprised of an elastic material. The material could be substantially solid. Alternatively, the material could have a generally honeycombed construction with internal pockets. In another alternate embodiment the body could comprise a balloon construction with an internal sealed area filled with gas, such as air. More than one internal sealed area or pocket filled with gas could be provided. In another alternate embodiment the body could comprise one or more internal sealed liquid filled pockets. These are only some examples. The important aspect is a body or mass which functions as a bubble body which can bubble or bulge in one location when depressed inward at another location. The ratio of bubbling or bulging to depression by a user is preferably 1:1, but could be more or less.

This invention describes how to use elastic material in a latching mechanism of an auto-open folding device. The invention can use deformation of an elastic part to release the locking mechanism. The device could be locked with a magnet or snaps for example. Elastic parts can be placed to sides and between the bottom and top housing members. The locking mechanism will be unlocked by elastic deformation when pressing the elastic part. Deformation of the elastic part will push the blocks apart.

Features of the invention could be used as a latch release for a latch system which holds housing members at an open position rather than at a closed position. The body 40 could be located at a location other than a lateral side of the first housing member. For use with a slide phone for example, the second side of the bubble body could push towards the top or bottom end of the telephone rather than towards a major face of the second housing member. The generally rectangular shape of the bubble body could be replaced by any suitable shape including, for example, a shape with a larger first side and smaller second side, or a shape with merely a shaped or patterned second side. The orthogonal relationship of the depression 54 to the bulging 56 could be replaced by a non-orthogonal relationship. The body 40 could work in cooperation with another member to open the telephone or for performing some other action.

Figure 8:
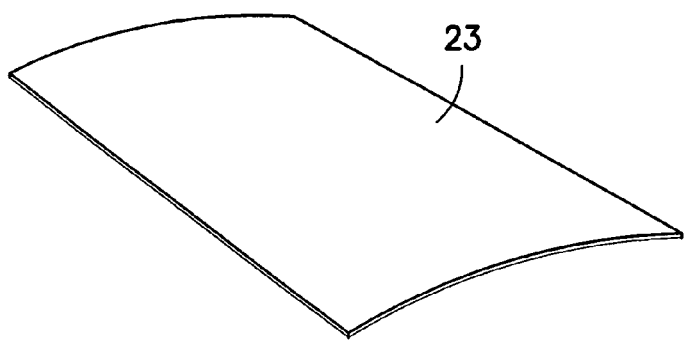
FIG. 8 is a perspective view of one of the springs used in the telephone shown in FIG. 1 in a home state.

Referring now to FIG. 8, there is shown a perspective view of one of the springs 23 in its home state or condition. The spring is a plate with a radius. This profile allows stopping of movement exactly at 180 degrees when opening the device. Additional mechanical stoppers are not needed. In this embodiment the device 10 comprises two of the springs 23. However, in alternate embodiments, more or less than two of the springs could be provided. The spring 23 is a plate or strip of resiliently deformable material, such as metal, plastic, a superelastic or shape memory material, or combinations thereof, for example. In another alternate embodiment one or more of the leaf springs could have a rod or tube shape. In this embodiment, the home state comprises a general elongate straight shape with a curved profile or cross section along its length. The radius of the curvature is uniform along its length, but could be non-uniform. In addition, only a portion of the plate spring might have a curved cross section, such as being flat at its ends; for example if the curved cross section portion is stamped or coined into that shape.

Figure 9:
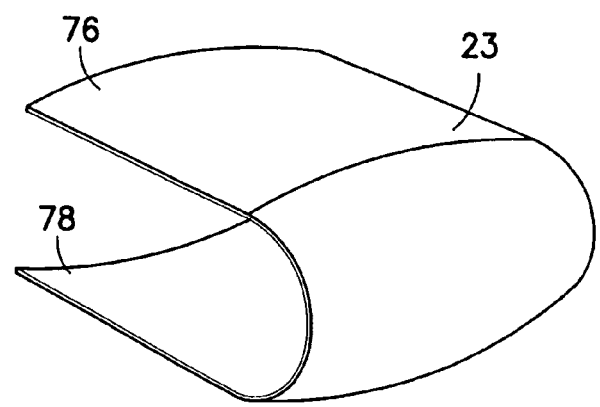
FIG. 9 is a perspective view of the spring shown in FIG. 8 is a bent, folded shape.

Referring also to FIG. 9, the plate spring 23 is shown in a folded shape, such as when the first and second housing members 14, 16 are in their folded closed position. The spring has a general "U" shape. In this folded shape the deformed spring 23 desires to unfold back to its home state shown in FIG. 8. The ends 76, 78 of the plate spring 23 are connected to the first and second housing members 14, 16, respectively. Thus, the spring 23 applies a biasing force to urge the device 10 to open. The latch system 24 is able to keep the device 10 closed. When the opening system 38 is actuated by the user, the latch system 24 is disengaged. The springs 23 are able to deflect back towards their home state. The plate springs 23 are able to function as an auto-open or open-assist system to flip the second housing member 16 to its open position.

Figure 10:
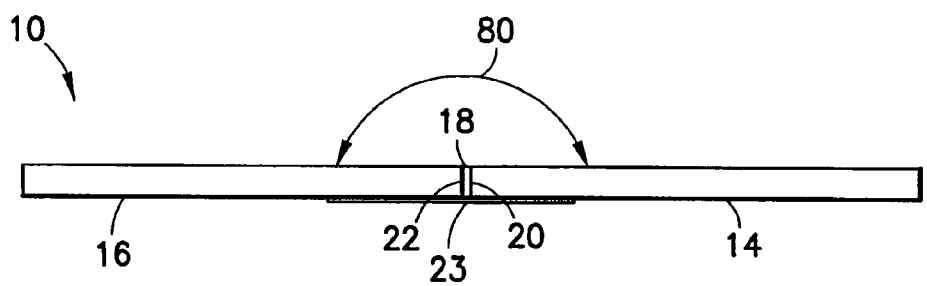
FIG. 10 is a side view of the telephone shown in FIG. 1 in an open, un-folded position.
Figure 11:
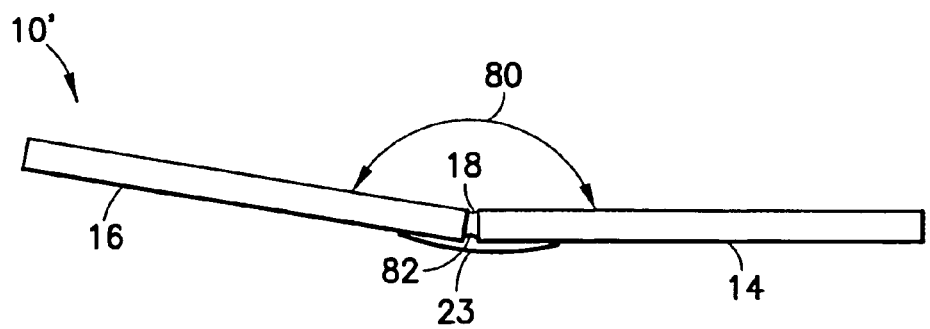
FIG. 11 is a side view as in FIG. 10 of an alternate embodiment of the invention.

Referring also to FIG. 10, because the springs 23 have a substantially straight home shape, the springs 23 are able to provide the open position as a substantially flat shape. The two housing members 14, 16 have center planes which are in the same plane, or at least parallel. This is because the second housing member is flipped an angle 80 which is about 180 degrees. The springs 23 are not located in the junction between the ends 20, 22 of the housing members. Thus, the ends 20, 22 can be located very close together, and perhaps even touch each other. This touching of each other could help resist further folding past the fully open position. Referring also to FIG. 11, an alternate embodiment is shown wherein the telephone 10' is identical to the telephone 10, except that the telephone 10' includes a stop 82. More than one stop could be provided. The stop(s) 82 could be a portion of one or both of the housing members 14, 16. However, the stop(s) could be part of another member or attached to the housing members, such as a projection from the springs 23 for example. The stop(s) 82 can limit rotation of the second housing member 16 relative to the first housing member 14 such that the angle 80 is less than 180 degree. In a preferred embodiment the angle 80 is about 165 degrees, but could be more or less.

Referring also to FIG. 12, the telephone 10 is shown in an open position. As can be seen, in this embodiment the spacing or distance 88 between the joystick 84 and the display 17 can be minimal with this type of compliant hinge design. Users could find this desirable, almost similar to a touch screen, but without the cost of a touch screen. More importantly, because of the very small distance between the ends 20, 22, a smaller size telephone can be provided.

Figure 13:
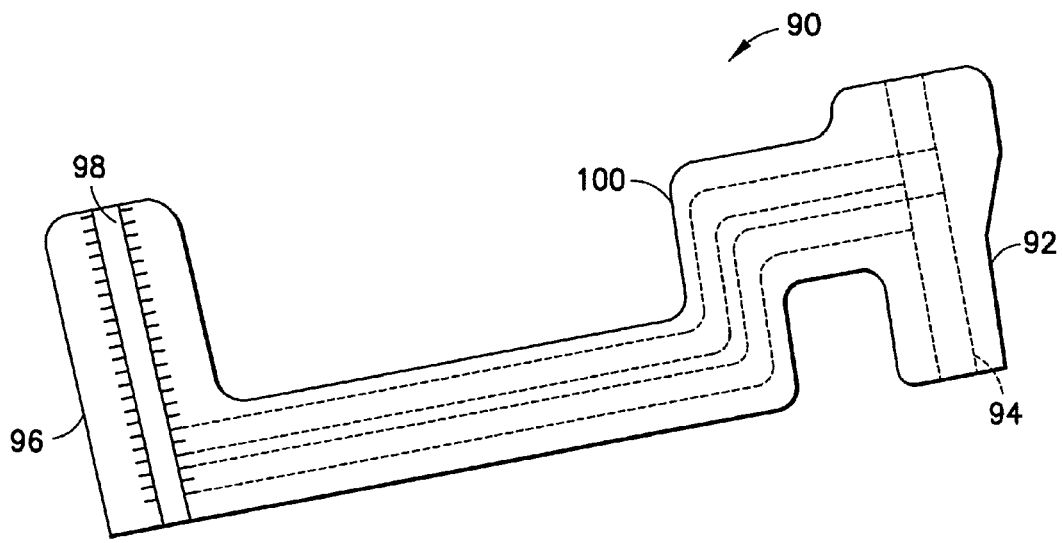
FIG. 13 is a perspective view of a flat flex cable assembly with connectors used in a conventional flip-phone type of mobile telephone.
Figure 14:
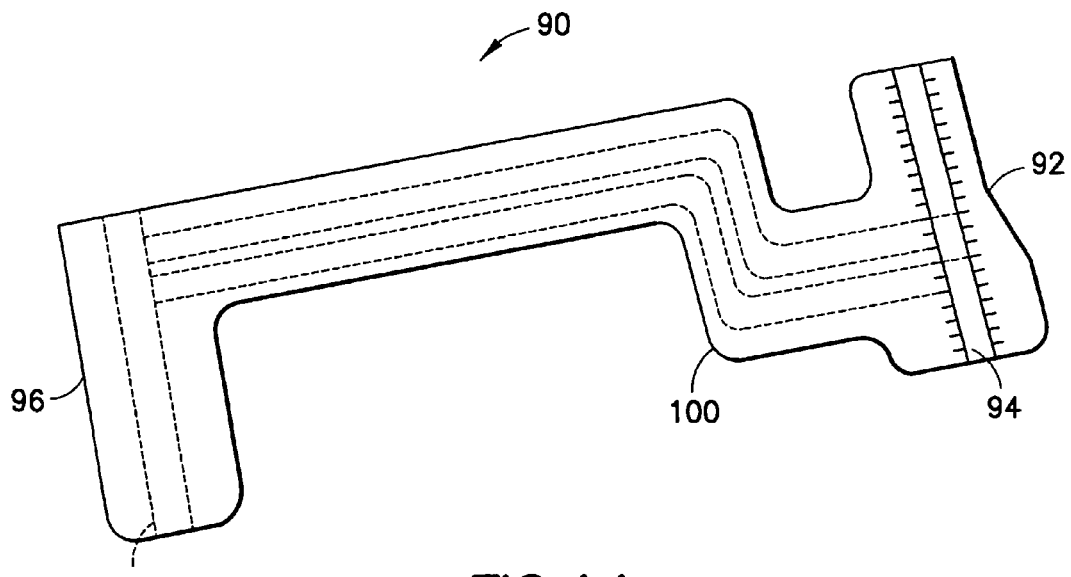
FIG. 14 is a perspective view of the flex cable assembly shown in FIG. 14 from the opposite side.

Referring also to FIGS. 13 and 14, top and bottom perspective views of a conventional electrical flex cable 90 is shown. The cable 90 is used in a flip-phone having a conventional hinge. The flex cable 90 has a first end 92 with a first electrical connector 94 and a second end 96 with a second electrical connector 98. The two electrical connectors are connected to mating electrical connectors in the two housings of the flip-phone. The jog or step 100 is provided to accommodate passing the cable through links of the hinge. With the invention, the jog 100 can be eliminated. The middle section of the flex cable can extend in the gaps between the two ends 20, 22 and perhaps covered by one or more of the springs 23. Thus, the spring(s) 23 can also function as a protective cover for the flex cable when the device 10 is closed. The flex cable might slide in and out of one or both of the housing members 14, 16 during opening and closing of the device 10 if desired.

Figure 15:
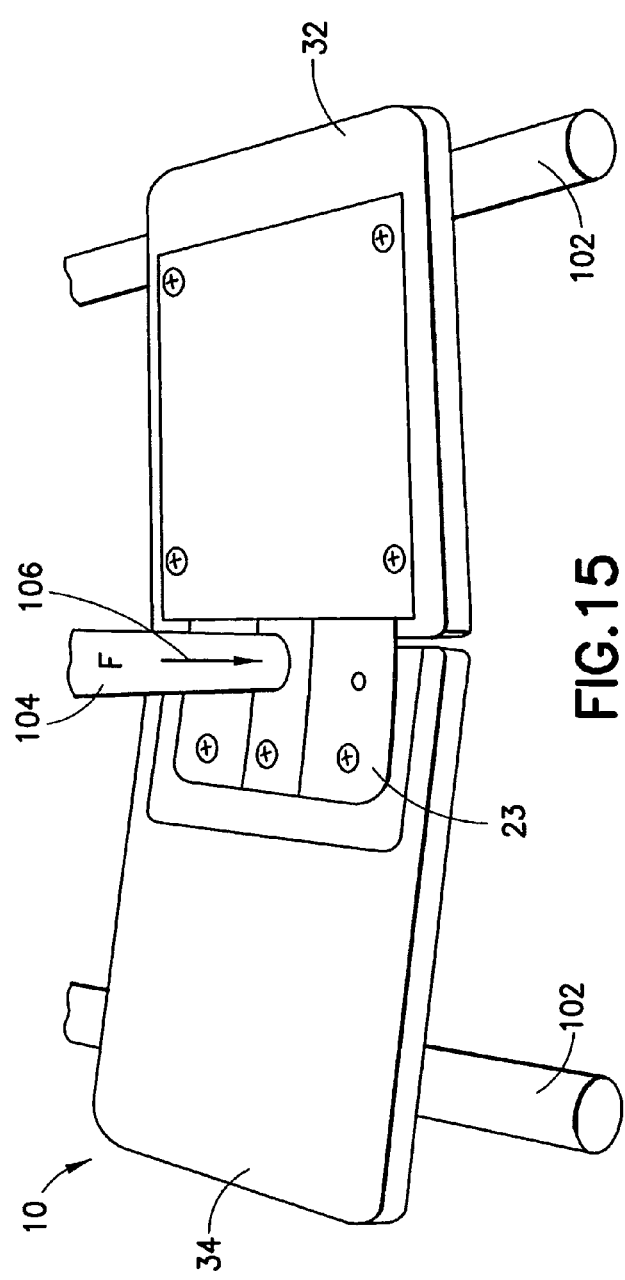
FIG. 15 is a perspective view of the telephone shown in FIG. 10 in a demonstration station to illustrate a signaling system when the housing members are over-rotated beyond an intended fully open, unfolded position.

Referring also to FIG. 15, one of the features of the invention is the ability to provide a signaling system for signaling the user if an over-rotation of the housing members 14, 16 occurs. In this embodiment the signaling system comprises one or more of the plate springs 23. In FIG. 15 the device 10 is shown in a demonstration stage to demonstrate the signaling system. The device is loaded into the demonstration stage in an open position, upside-down. The demonstration stage has a flat surface with the opposite ends 32, 34 of the device on elevated test supports 102. A test pusher 104 is shown pushing down on the hinge area of the device 10 as indicated by arrow 106. The demonstration stage is able to over-rotate the two housing members 14, 16 past the fully open position. Because of the cross sectional curve of the springs 23, the when the two housing members 14, 16 are over-rotated past the fully open position, the plate springs 23 loose their cross sectional curvature with a snapping action and bend in a direction reverse to the bend shown in FIG. 9. The snapping action generates an audible snapping sound. This is similar to the sound made by a measuring tape of a measuring tape reel when the tape is bent in a wrong direction. This sound is preferably generated before the housing members 14, 16 are over-rotated too much; causing damage to the flex cable or other components. Thus, the sound can signal a user that damage is about to occur. The user can then take action to prevent further over-rotation and resulting possible damage. Hence, one or more of the springs 23 also provide a signaling system.

Figure 16:
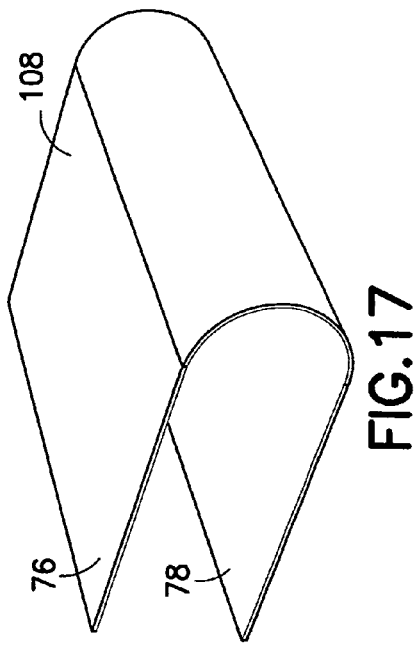
FIG. 16 is a perspective view of an alternate embodiment of the spring shown in FIG. 8 in a home state.

Referring also to FIG. 16, there is shown a perspective view of an alternate embodiment of one of the springs in its home state or condition. One or both of the springs in the device could be the spring 108 rather than the spring 23. The spring 108 is a plate or strip of resiliently deformable material, such as metal, plastic, a superelastic or shape memory material, or combinations thereof, for example. In this embodiment, the home state comprises a general elongate straight shape with a flat profile or cross section along its length.

Figure 17:
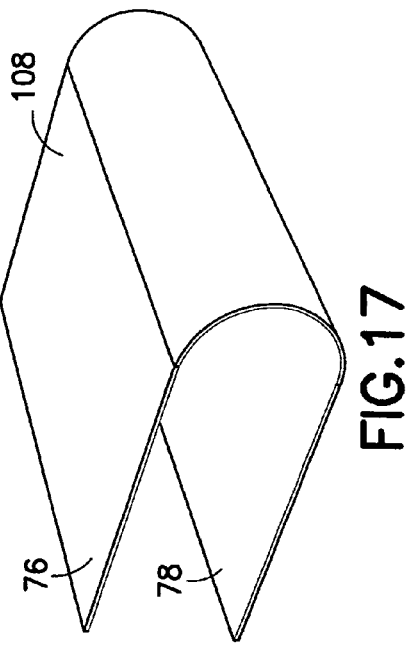
FIG. 17 is a perspective view of the spring shown in FIG. 16 is a bent, folded shape.

Referring also to FIG. 17, the plate spring 108 is shown in a folded shape, such as when the first and second housing members 14, 16 are in their folded closed position. The spring has a general "U" shape. In this folded shape the deformed spring 108 desires to unfold back to its home state shown in FIG. 16. The ends 76, 78 of the plate spring 108 are connected to the first and second housing members 14, 16, respectively. Thus, the spring 108 applies a biasing force to urge the device 10 to open. The latch system 24 is able to keep the device 10 closed. When the opening system 38 is actuated by the user, the latch system 24 is disengaged and the plate springs 108 are able to function as an auto-open or open-assist system to flip the second housing member 16 to its open position. The springs 108 are able to deflect back towards their home state.

Figure 18:
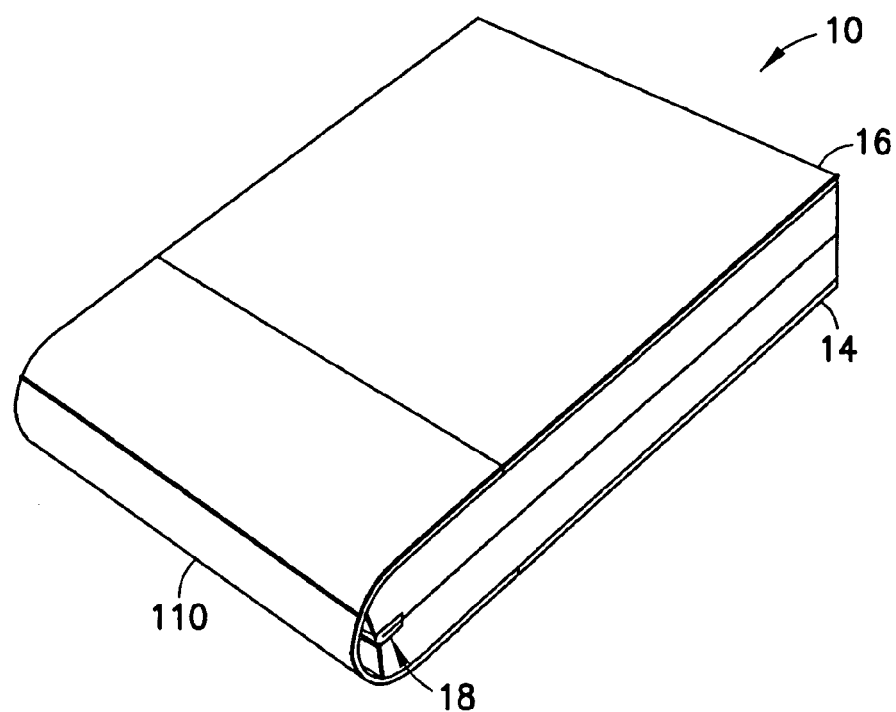
FIG. 18 is a perspective view of the telephone shown in FIG. 1 with a cover as part of the hinge arrangement in a closed, folded position.
Figure 19:
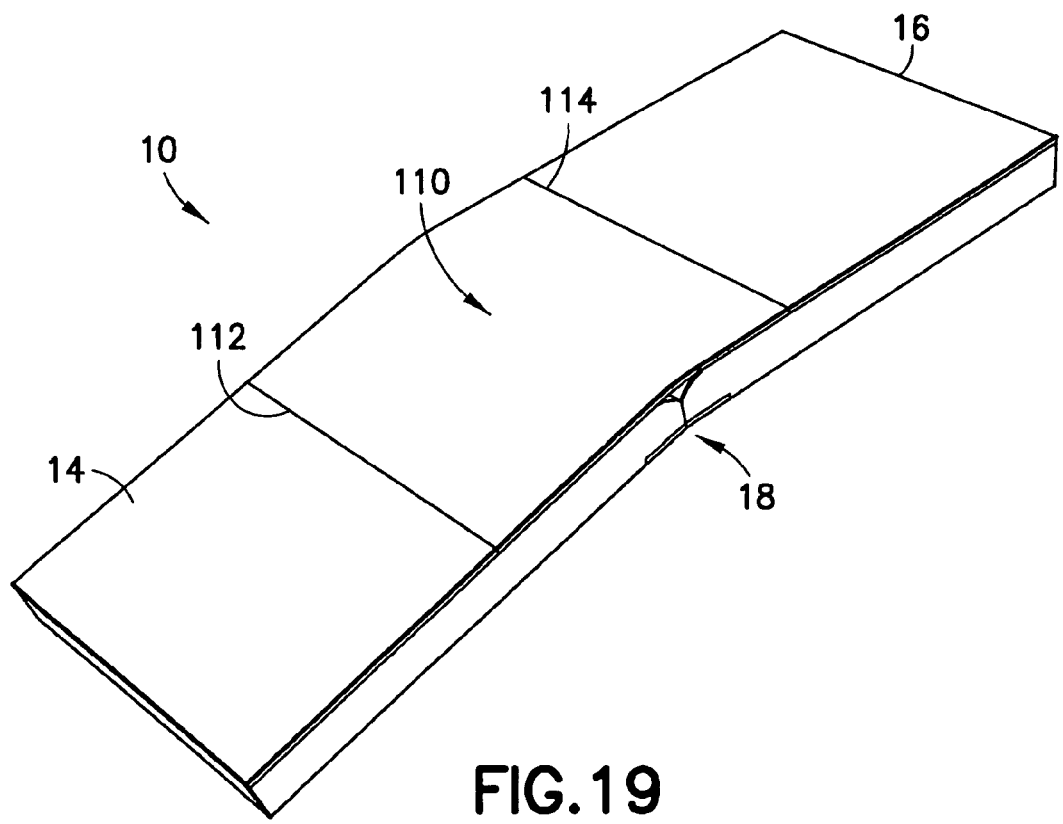
FIG. 19 is a perspective view of the telephone shown in FIG. 18 in an open, unfolded position.

Referring now to FIGS. 18 and 19, the device 10 is shown with the addition of an elastic deformable cover 110 as part of the hinge arrangement. The cover 110 could be comprised of any suitable material, such as leather, textile, or a combined textile and polymer assembly for example. The cover 110 is able to stretch. FIG. 19 shows the cover 110 at its home state. A first end 112 of the cover is connected to the bottom side of the first housing member 14. A second end 114 of the cover is connected to the top side of the second housing member 16. The cover 110 covers the springs 23 and the flex cable at the junction of the first and second housing members. When the housing members 14, 16 are closed to their folded position as shown in FIG. 18, the cover 110 can stretch over the springs 23. When the device is opened again, the cover 110 can contract back towards its home state.

Figure 20:
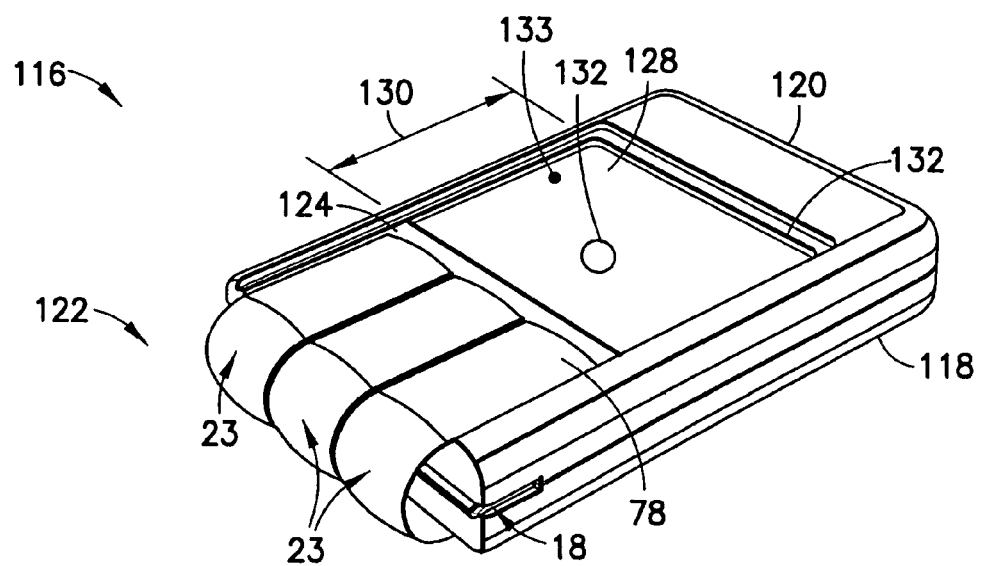
FIG. 20 is a perspective view of an alternate embodiment of the telephone shown in FIG. 1 in a closed, folded position.
Figure 21:
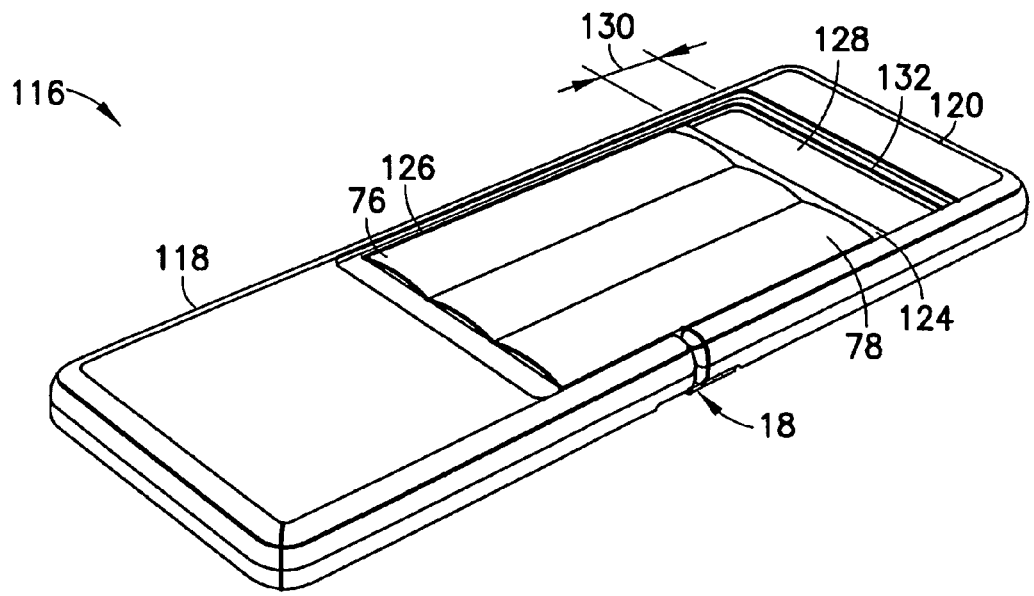
FIG. 21 is a perspective view of the telephone shown in FIG. 20 is an open, unfolded position.

Referring now to FIGS. 20-21, another alternate embodiment of the invention is shown. In this embodiment the portable electronic device 116 comprises a mobile telephone with two housing members 118, 120 connected together in a general flip-phone style with a hinge arrangement 122. The hinge arrangement 122 comprises a living hinge 18, three springs 23 and a slide 124. The springs 23 have a first end 76 stationarily connected to the first housing member 118 in a pocket 126. The ends 76 may be flat such that a majority of the length of the springs 23 have a cross sectionally curved shape; not the entire length. The slide 124 is slidably mounted in a pocket 128 of the second housing member 120. The second ends 78 of the springs 23 are fixedly attached to the second housing member 120.

When the device 116 is opened and closed, the first ends 76 of the springs 23 remain stationary relative to the first housing member 118. However, when the device 116 is opened and closed, the second ends 78 of the springs 23 cause the slide 124 to move back and forth in the pocket 128. The distance 130 can change, such as between 30 mm and 5 mm for example. Alternatively, the device could be sized and shaped such that the slide 124 contacts the stop surface 132 to act as a stop for limiting rotation or over-rotation of the housing members. This arrangement can provide for less chance of binding of the springs on the housing(s) as the springs move relative to the housings.

One of the features of this type of design is that the springs 23 can be used for another function. In particular, linear motion provided by the springs 23 can be combined with any other suitable function. For example, in the device 116 a camera 132 is provided at the pocket 128. When the device is closed, the camera is exposed. However, when the device is opened, the camera is covered. In an alternate embodiment the spring(s) or slide 124 could move an actuator to move a lens cover away from the camera lens when the device is opened, and move the actuator to move the lens cover over the camera lens when the device is closed. This is only one example. The slide 124 could activate an electrical microswitch 133 connected to the electronic circuitry of the device to activate or control activation of any suitable software application, process or task.

Figure 22:
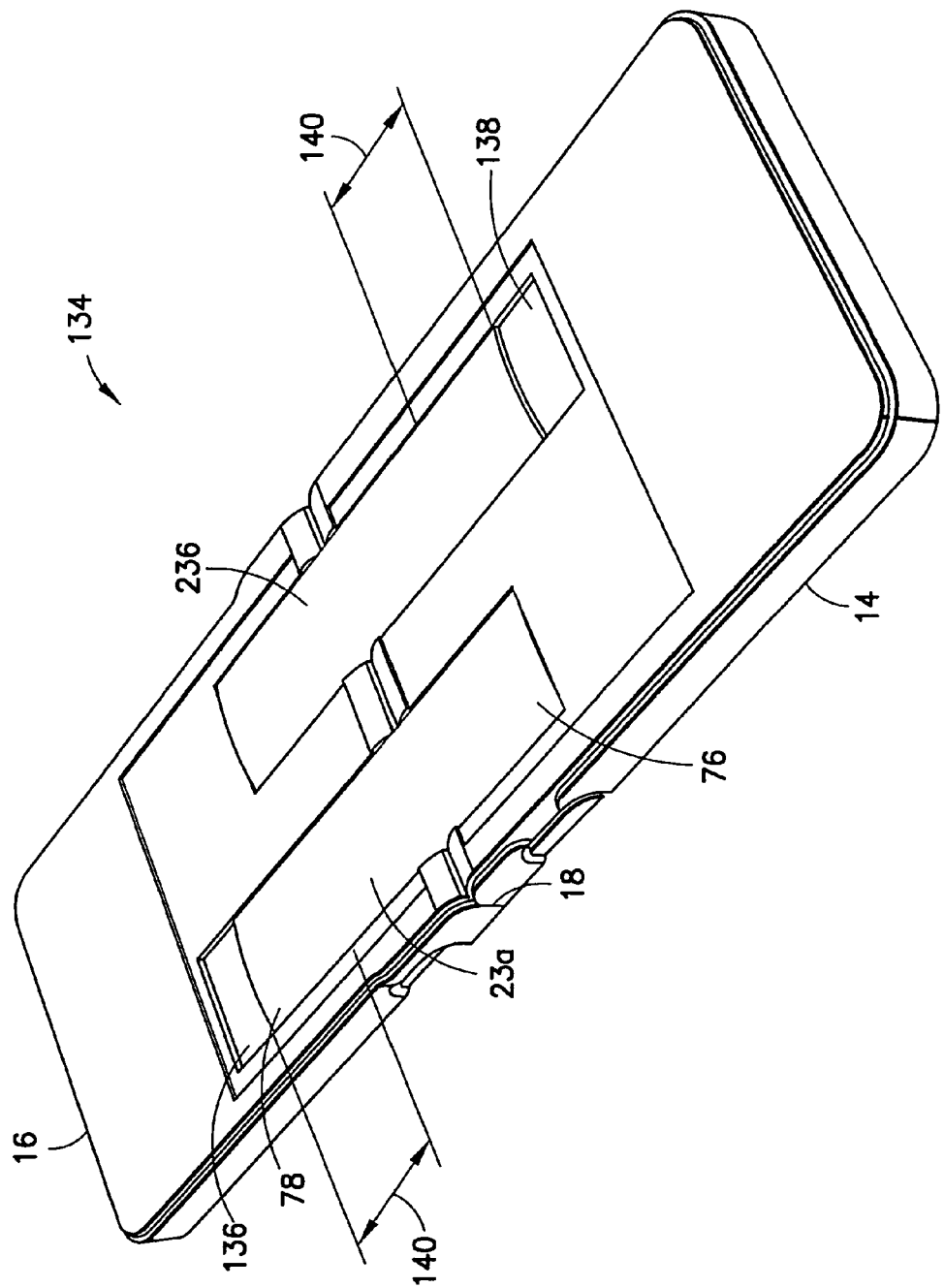
FIG. 22 is a perspective view of an alternate embodiment of the telephone shown in FIG. 1 in an open, unfolded position.

Referring now to FIG. 22, another alternate embodiment of the invention is shown. In this embodiment the portable electronic device 134 is identical to the device 10 except for the connection of the springs 23 to the housing members 14, 16. In this embodiment the first spring 23a has a first end 76 fixedly attached to the first housing member 14. The second end 78 of the first spring 23a is slidably connected to the second housing member 16 is a slot 136. The second spring 23b has a first end 76 fixedly attached to the second housing member 16. The second end 78 of the second spring 23b is slidably connected to the first housing member 14 is a slot 138.

FIG. 22 shows the device 134 in its open, un-folded position. When the device 134 is folded into its closed position at hinge 18, the two second ends 78 slide downward in the slots 136, 138 distances 140 as the springs 23 bend into their U shapes. It should be noted that in alternate embodiments the hinge 18 might not be a living hinge. Any suitable pivotable connection could be provided for this embodiment, or for any of the other embodiments.

Figure 23:
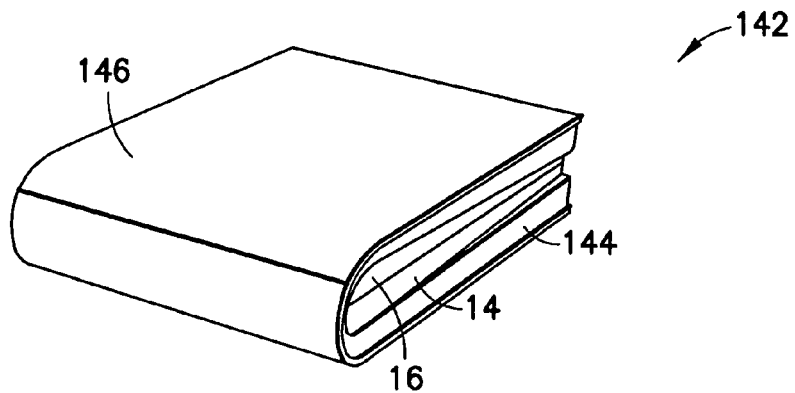
FIG. 23 is a perspective view of an alternate embodiment of the telephone shown in FIG. 1 in a closed, folded position.
Figure 24:
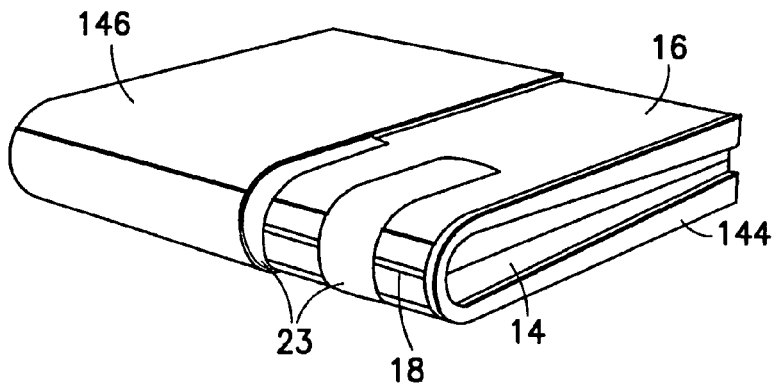
FIG. 24 is a perspective view of the telephone shown in FIG. 23 with the elastic cover partially removed.
Figure 25:
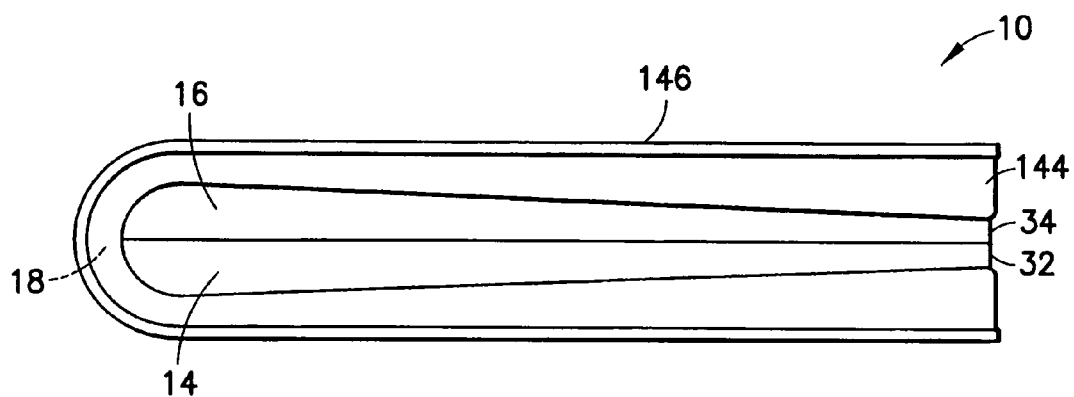
FIG. 25 is an elevational side view of the telephone shown in FIG. 23.

Referring now to FIGS. 23-25, another alternate embodiment of the invention will be described. The portable electronic device 142 is identical to the device 10 except as described below. The housing 12 comprises the first and second housing members 14, 16 and a third housing member 144. The third housing member 144 comprises an elastic material that is overmolded onto the first and second housing members 14, 16. The third housing member 144 may form the living hinge 18 if desired. The third housing member 144 is overmolded onto the outer lateral edges of the first and second housing members 14, 16 with a thinner section at the hinge 18 and thicker sections at the ends 32, 34. The cover 146 is the same as the cover 110 except that the cover 146 covers the entire bottom and top sides of the first and second housing members 14, 16, respectively. The cover 146 is also preferably connected to the outer edge of the third housing member 144; perhaps during overmolding of the third housing member onto the first and second housing members for example. This embodiment illustrates that a multi-material molder cover can be provided. In an alternate embodiment the third housing member might not be overmolded. Instead, the third housing member could merely be molded and then attached to the first and second housing members.

The invention can use a simple metal or plastic plate as a spring together with a living hinge for an auto-open folding device. The invention provides a simple compliant hinge mechanism which can be used in folding devices. This compliant hinge mechanism has many advantages compared to current hinge mechanism. It is simple to manufacture, cost effective, it solves many phone architectural problems, and gives something new for industrial design.

The invention solves, for example, electrical flex cable path problems between bottom and top covers in folding devices. An electrical flex cable between bottom and top covers can also be better protected with this new simple hinge mechanism. Auto-open with this hinge mechanism is possible, and no extra springs are needed anymore because the hinge works as a spring. Hinges are usually complicated system because of need to provide a path for an electrical flex cable. Miniaturization is easier for this invention than with existing hinge mechanisms because of dimensional limitations. Conventional hinge mechanisms are composed of many different parts. Assembly of conventional hinge mechanisms takes an increased amount of time because of the many parts and the complicated flex between bottom and top cover.

The ability to provide an auto-open feature has been solved with the invention. For example, in the past it has been suggest to use space taking spring loaded rigid hinges with a mechanical release button or with an electric motor. With the invention, there is no need for space taking spring loaded rigid hinges with a mechanical release button or with an electric motor.

This invention generally merely comprises use of a living hinge with simple plates which works as a spring. With these parts it is possible-to manufacture a hinge mechanism, simply and cost effectively, for any suitable folding device, and which also provides many advantages. This new hinge mechanism can be composed of four main parts: a living hinge which is integrated to covers; one or more metal or plastic plates; a locking or latching mechanism to retain the housing members at a folded latched position; and material in the hinge area which can be a little bit elastic to over the spring plate(s), such as textile, leather, etc. for example. The plate(s) can have a profile similar to a measuring tape in a measuring tape reel; with a curved radius or without a radius (flat).

When the device is closed, the spring plates are loaded. The locking mechanism can be, for example, a magnet or snaps. When the device is closed and the locking mechanism is unlocked, the device can open automatically, such as 180 degrees for example, to its open position. With a curved profile of a spring plate, it is possible to stop the movement exactly at 180 degrees without a further location system. The plate(s) also can be without a curved profile, but then the open position would have to be done with the addition of one or more mechanical stoppers.

The "click effect" of the curved profile spring plate can occur before a mechanical limitation is reach of the device being un-folded more than 180 degrees; which is not allowed. In normal use, this click effect will not happen. The click effect would only occur if the device is forcefully misused. Thus, the audible "click effect" can be new feature in folding portable electronic devices which warn the user that device is being misused and could be damaged. Merely because the "click effect" occurs does not mean that the hinge will break. It merely signals that the hinge has been over extended and damage to the portable electronic device, such as the flex cable, may occur. The telephone could be adapted to open to 165 degrees for example, and the click effect could occur at 180 degrees for example. Any suitable angles could be provided.

The spring plate(s) may be provided with linear movement on one or both of the housing members which occurs when the device is opened and closed. This linear movement can be used with other features. For example, the linear movement of the spring plate(s) could cover and uncover a camera lens. Thus, a camera lens protection system could be provided in conjunction with the linear movement of the spring plate(s). Linear movement can be used in bottom and top housing members at the same time if more than one plate will be attached to the hinge mechanism.

Advantages of the invention include:
Simple configuration;
Easy to manufacture and assemble;
Reduce amount of parts;
Gives new possibilities for industrial design;
Automatic open feature is available;
Automatic open possible exactly to 180 degrees without mechanical stoppers;
Hinge is almost invisible;
It is possible to place the display and the joystick closer together than in a convention device because virtually no space is needed for hinge anymore when the device is un-folded;
Linear movement of the plate(s) can be used in conjunction with other features during opening and closing the device; and
A compliant opening mechanism can be used in this compliant hinge mechanism.

Figure 26:
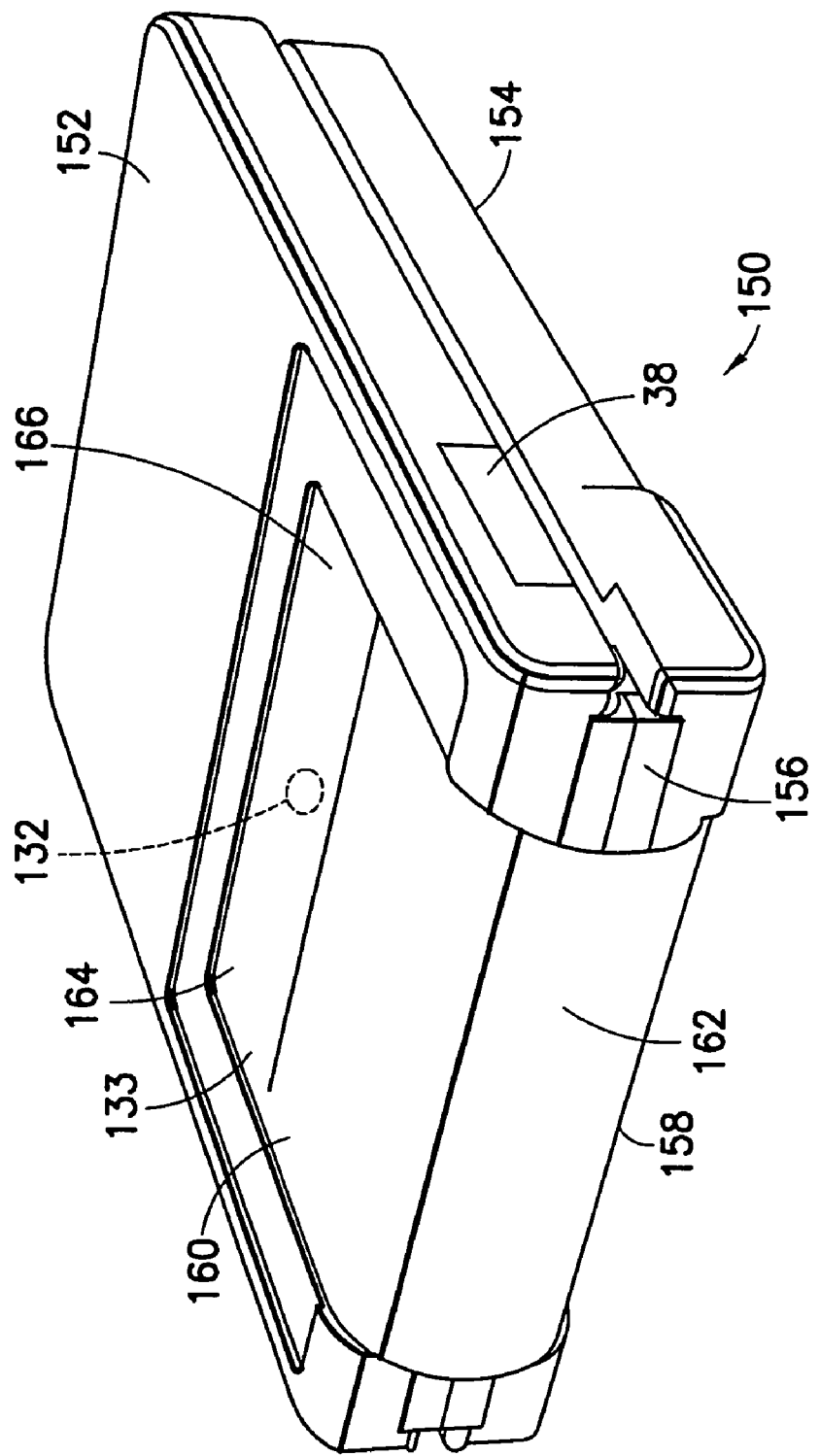
FIG. 26 is a perspective view of another alternate embodiment of a device comprising features of the invention.
Figure 27:
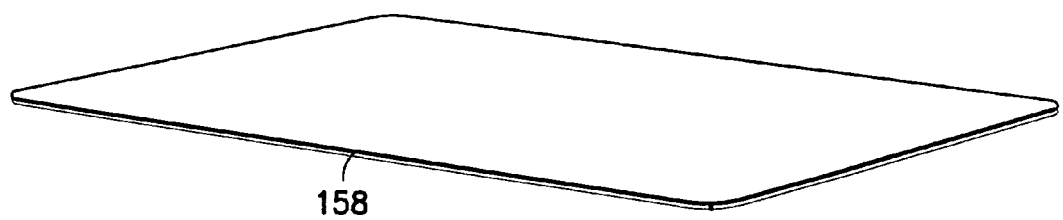
FIG. 27 is a perspective view of the spring used in the hinge arrangement of the device shown in FIG. 26.

Referring also to FIGS. 26-27; another embodiment will be described. FIG. 26 shows a portable electronic device 150, such as a mobile telephone for example, which is identical to the device 116 shown in FIGS. 20-21 except as noted below and as shown in the drawings. The device 150 comprises two housing members 152, 154 connected to each other by a hinge 156. The hinge 156 can be a living hinge or any other suitable type of hinge or movable connection. The first housing member 152, similar to the first housing member 118, has electronic circuitry and a keypad. The second housing member 154, similar to the second housing member 120, has a display. FIG. 26 shows the device is a closed, folded position. The first housing member 152 has the opening system 38. However, in an alternate embodiment the second housing member could have the opening system. In another alternate embodiment an opening system might not be provided such as when the user merely uses his or her fingers to unlatch the latch system holding the two housing members 152, 154 in the closed, folded position.

Figure 28:
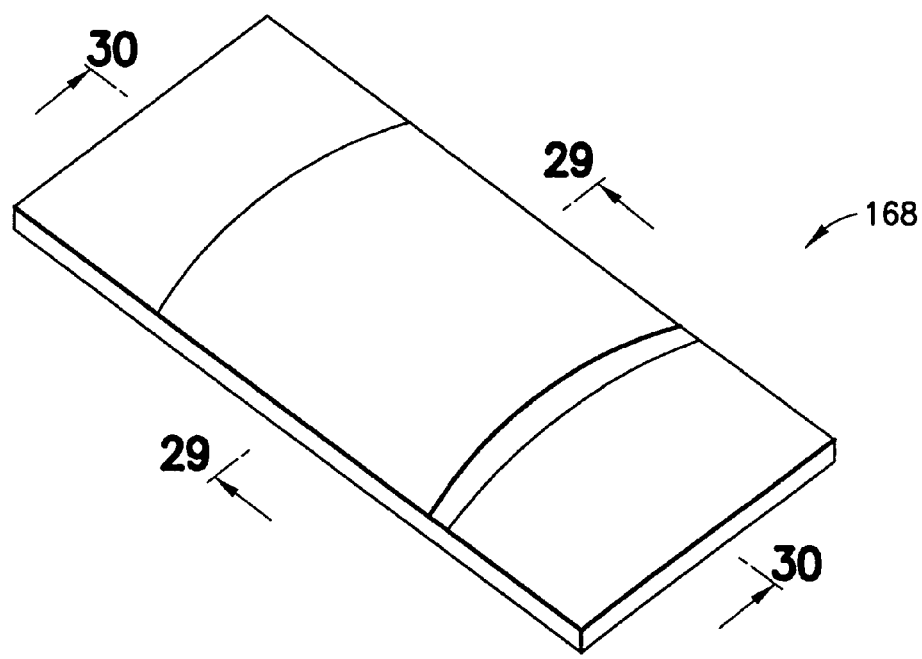
FIG. 28 is a perspective view of an alternate embodiment of the spring for use with the invention.
Figure 29:
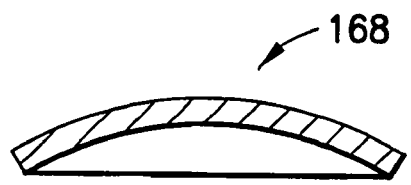
FIG. 29 is a cross sectional view of the spring shown in FIG. 28 taken along line 29-29.
Figure 30:
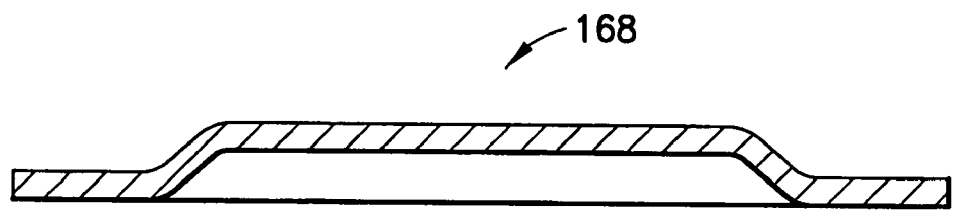
FIG. 30 is a cross sectional view of the spring shown in FIG. 28 taken along line 30-30.
Figure 31:
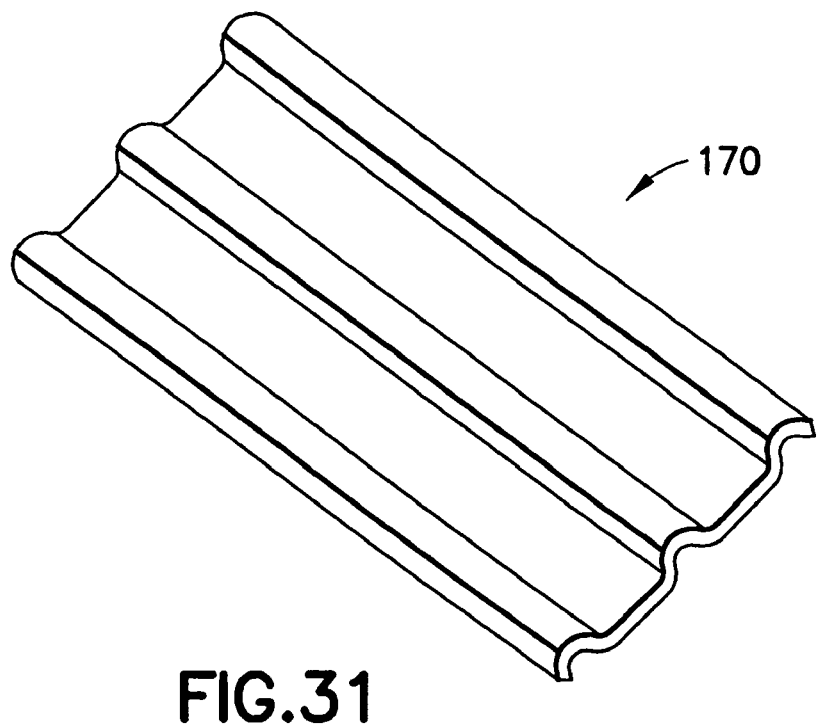
FIG. 31 is a perspective view of an alternate embodiment of the spring for use with the invention.

The hinge 156 forms part of a hinge assembly which comprises a single spring 158. FIG. 27 shows the spring 158 in its home, undeflected state. The spring 158 in this embodiment comprises a leaf spring in the form of a flat plate similar to the spring 108 shown in FIG. 16. However, the spring 158 is wider than the spring 108. The spring 158 has a width which is wider than a majority of the width of the housing members 152, 154. The spring 158 has a first end which is stationarily connected to the second housing member 154, a second end 160 that is slidably connected to the first housing member 152, and a middle section 162 which bends around the hinge 156 about 180 degrees when the device 150 is in the closed, folded position. The spring 158 could have a home state with a curved cross section similar to that shown in FIG. 8. As another alternative, the shape could be partially curved in cross section as shown in the spring 168 of FIGS. 28-30 or patterned as demonstrated in the spring 170 of FIG. 31.

The first housing member 152 has a wide groove 164 on its exterior side which the second end 160 is able to slide in; preferably with a sliding interlocking engagement for example. When the device 150 is unfolded, the second end 160 of the spring 158 can cover the camera lens 132 and/or actuate a switch 133. In this embodiment an electrical contact 166 is illustrated. The spring 158, if made of electrically conductive material, could be used as an electrical conductor (such as a ground conductor for example) which can contact the electrical contact 166 when the device 150 is opened to form an electrical path through the spring 158 between circuitry in the first and second housing members 152, 154. With multiple springs, multiple conductors can be formed. The hinge arrangement could include a cover similar to the cover 146 or the cover 110 for example.

As noted above, the spring could be comprised of an electrically conductive metal. Besides functioning as a mechanical shield for the hinge 156, the spring 158 could also be configured to function as a portion of an EMI (electromagnet interference) shield, or a portion of an antenna for the device.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. A hinge arrangement for a portable communication device comprising: a living hinge adapted to movably connect two members to each other; and at least one leaf spring adapted to connect to the two members, wherein, when the two members are in a folded position, the living hinge has a general "U" shape and the leaf spring has a general "U" shape aligned with and generally overlapping the general "U" shape of the living hinge, and wherein a first one of the at least one leaf spring has a first end which is sized and shaped to be longitudinally slidably connected to a first one of the two members.

2. A hinge arrangement for a portable communication device as in claim 1 wherein the at least one leaf spring comprises at least two leaf springs arranged parallel to each other.

3. A hinge arrangement for a portable communication device as in claim 1 wherein the living hinge connects ends of the two members to each other and the first leaf spring overlaps the ends of the two members.

4. A hinge arrangement for a portable communication device as in claim 1 wherein the first leaf spring has a cross sectional curved shape along its length.

5. A hinge arrangement for a portable communication device as in claim 1 wherein the first leaf spring comprises an opposite second end stationarily connected to a second one of the two members.

6. A hinge arrangement for a portable communication device as in claim 5 wherein the at least one leaf spring comprises at least two plate springs, wherein a second one of the plate springs has a first end slidably connected to the first member and an opposite second end stationarily connected to the second member.

7. A hinge arrangement for a portable communication device as in claim 5 wherein the at least one leaf spring comprises at least two plate springs, wherein a second one of the plate springs has a first end stationarily connected to the first member and an opposite second end slidably connected to the second member.

8. A hinge arrangement for a portable communication device as in claim 1 further comprising an elastic cover adapted to be connected to the two members and cover the at least one leaf spring.

9. A hinge arrangement for a portable communication device as in claim 1 wherein the at least one leaf spring comprises a strip of metal or plastic.

10. A hinge arrangement for a portable communication device as in claim 1 wherein the at least one leaf spring comprises a strip of superelastic material.

11. A portable electronic device comprising:
a first housing member comprising electronic circuitry;
a second housing member; and a hinge arrangement for a portable communication device as in claim 1 connecting an end of the first housing member to an end of the second housing member.

12. A portable electronic device as in claim 11 wherein the portable electronic device comprises a mobile telephone with the first housing member comprising a microphone and the second housing member comprising a sound transducer, wherein the at least one spring plate is adapted to bias the first and second housing members from the folded position to an open un-folded position about 165 degrees apart.

13. A portable electronic device as in claim 11 wherein the portable electronic device comprises a mobile telephone with the first housing member comprising a microphone and the second housing member comprising a sound transducer, wherein the at least one spring plate is adapted to bias the first and second housing members from the folded position to an open un-folded position about 180 degrees apart and in-line with each other with a substantially flat shape.

14. A portable electronic device as in claim 11 wherein the at least one leaf spring comprises an auditory signaling system when the first and second members are over-folded from the folded position past a fully open position.

15. A portable electronic device as in claim 14 wherein the auditory signaling system comprises a cross section curve of the at least one plate along its length.

16. A portable electronic device as in claim 11 wherein the living hinge comprises a portion of an overmolded member molded onto lateral sides of the first and second housing members.

17. A portable electronic device as in claim 11 wherein an end of the at least one leaf spring is slidably connected to first housing member, wherein the first housing member comprises a switch adapted to be actuated by movement of the end of the at least one leaf spring.

18. A hinge arrangement for a portable communication device as in claim 1 wherein the first leaf spring has a second end which is sized and shaped to be longitudinally slidably connected to a second one of the two members.

19. A portable electronic or communication device comprising: a first housing member comprising electronic circuitry;
a second housing member pivotably connected to the first housing member by a pivotable connection; and a first leaf spring connected to the first and second housing members proximate the pivotable connection, wherein the leaf spring is adapted to bend between a general "U" shape when the first and second housing members are in a folded position and a substantially straight shape when the first and second members are in an open un-folded position, wherein the first leaf spring comprises an auditory signaling system when the first and second housing members are over-folded past the open un-folded position, wherein the leaf spring has a first end longitudinally slidably connected to the first housing member.

20. A portable electronic or communication device as in claim 19 further comprising a second leaf spring connected to the first and second housing members generally parallel to the first leaf spring.

21. A portable electronic or communication device as in claim 19 wherein the leaf spring has a cross sectional curved shape along its length.

22. A portable electronic or communication device as in claim 19 wherein the leaf spring has an opposite second end stationarily connected to the second housing member.

23. A portable electronic or communication device as in claim 22 further comprising a second leaf spring, wherein the second leaf spring has a first end slidably connected to the first housing member and an opposite second end stationarily connected to the second housing member.

24. A portable electronic or communication device as in claim 22 further comprising a second leaf spring, wherein the second leaf spring has a first end stationarily connected to the first housing member and an opposite second end slidably connected to the second housing member.

25. A portable electronic or communication device as in claim 22 further comprising an elastic cover connected to the first and second housing members and covering the leaf spring.

26. A portable electronic or communication device as in claim 22 wherein the leaf spring comprises a strip of metal or plastic.

27. A portable electronic or communication device as in claim 22 wherein the leaf spring comprises a strip of shape memory alloy.

28. A portable electronic or communication device as in claim 19 wherein the portable electronic device comprises a mobile telephone with the first housing member comprising a microphone and the second housing member comprising a sound transducer, wherein the spring plate is adapted to bias the first and second housing members from the folded position to the open un-folded position about 165 degrees apart.

29. A portable electronic or communication device as in claim 19 wherein the portable electronic device comprises a mobile telephone with the first housing member comprising a microphone and the second housing member comprising a sound transducer, wherein the spring plate is adapted to bias the first and second housing members from the folded position to the open un-folded position about 180 degrees apart and in-line with each other with a substantially flat shape.

30. A portable electronic or communication device as in claim 19 wherein the auditory signaling system comprises a cross section curve of the leaf spring along its length.

31. A portable electronic or communication device as in claim 19 further comprising wherein the pivotable connection comprises a living hinge connecting ends of the two members to each other and the leaf spring partially overlaps the ends of the two members.

32. A portable electronic or communication device as in claim 31 wherein the living hinge comprises a portion of an overmolded member molded onto lateral sides of the first and second housing members.

33. A portable electronic or communication device comprising: a first housing member comprising electronic circuitry;
a second housing member pivotably connected to the first housing member by a pivotable connection between a closed folded position and an open unfolded position; and a system for audibly signaling when the first and second housing members are over-rotated past the open un-folded position, wherein the system for audibly signaling comprises a leaf spring connected to the first and second housing members at the pivotable connection, and wherein the leaf spring has a first end which is longitudinally slidably connected to the first housing member.

34. A method of manufacturing a portable electronic or communication device comprising:
providing a pivotable connection between a first housing member and a second housing member, wherein the pivotable connection comprises a living hinge, and wherein the first and second housing members are movable between a folded position and an un-folded position; and
connecting at least one spring to the first and second housing members to bias the first and second housing members towards the un-folded position, wherein the at least one spring comprises a leaf spring which has a general "U" shape when the first and second housing members are in the folded position, and wherein the leaf spring has a substantially straight shape when the first and second housing members are in the un-folded position, and wherein a first end of the leaf spring is longitudinally slidable on the first housing member.

35. A method as in claim 34 wherein a second end of the leaf spring is longitudinally slidable on the second housing member.

* * * * *